(12) United States Patent
Balan

(10) Patent No.: US 6,912,975 B1
(45) Date of Patent: Jul. 5, 2005

(54) RETRACTABLE TETHER FOR A PET

(76) Inventor: James D. Balan, 9A Nashua St., Somerville, MA (US) 02143

( * ) Notice: Subject to any disclaimer, the term of this patent is extended or adjusted under 35 U.S.C. 154(b) by 0 days.

(21) Appl. No.: 10/609,450

(22) Filed: Jun. 27, 2003

(51) Int. Cl.[7] .................. A01K 27/00; B65H 75/34
(52) U.S. Cl. ..................... 119/794; 119/796
(58) Field of Search ................. 119/794, 796

(56) References Cited

U.S. PATENT DOCUMENTS

| | | | |
|---|---|---|---|
| 2,799,245 A | * | 7/1957 | Ruggiero et al. ........... 119/794 |
| 2,833,250 A | * | 5/1958 | Beebe .................. 119/794 |
| 2,889,807 A | * | 6/1959 | Beebe .................. 119/794 |
| 3,250,253 A | * | 5/1966 | Galin .................. 119/794 |
| 4,197,817 A | | 4/1980 | Crutchfield |
| 4,328,766 A | | 5/1982 | Deibert |
| 4,328,767 A | | 5/1982 | Peterson |
| 4,964,370 A | * | 10/1990 | Peterson ................ 119/794 |
| 5,233,942 A | | 8/1993 | Cooper et al. |
| 5,816,198 A | * | 10/1998 | Peterson ................ 119/794 |
| 5,947,062 A | | 9/1999 | Hoffman et al. |

* cited by examiner

*Primary Examiner*—Teri Pham Luu
*Assistant Examiner*—Bret Hayes
(74) *Attorney, Agent, or Firm*—Richard L. Miller

(57) ABSTRACT

A retractable tether for a pet. A leash is retractably connected to a collar by a pair of retractors. Each retractor includes a housing and a retracting mechanism. The retracting mechanism includes an axle and a recoilable spring. In one embodiment, the recoilable spring allows the leash to freely recoil and be automatically wrapped around the axle when tension is removed from the leash. In another embodiment, each retractor further includes a ratchet mechanism. The ratchet mechanism does not allow the leash to freely recoil and be automatically wrapped around the axle when tension is removed from the leash, but rather requires an initial tug on the leash and maintaining tension thereon to cause the leash to wrap around the axle.

14 Claims, 1 Drawing Sheet

RETRACTABLE TETHER FOR A PET

BACKGROUND OF THE INVENTION

1. Field of the Invention

The present invention relates to a retractable tether. More particularly, the present invention relates to a retractable tether for a pet.

2. Description of the Prior Art

Numerous innovations for retractable tethers have been provided in the prior art that will be described. Even though these innovations may be suitable for the specific individual purposes to which they address, however, they differ from the present invention.

A FIRST EXAMPLE, U.S. Pat. No. 4,197,817 to Crutchfield teaches a device which can be attached to the collar of a dog or other pet which device contains all the elements of a leash necessary for walking the animal. A spool is disposed in a housing and connected thereto by an axle member which runs through the center of the spool. A spring is disposed in the center of the spool and connected to the axles and spool so as to impart rotary motion to the spool. A leash is connected at one end to the spool and at the other end to a foldable handle. When allowed to run free, the spool rotates by action of the spring, thus coiling the leash thereon until the handle makes contact with the housing. The handle is folded around the housing in a groove provided therefor. The handle may be pulled away from the housing and the leash uncoiled to the desired length whereupon a small cam is wedged between the spool and the housing thus stopping of the motion of the spool.

A SECOND EXAMPLE, U.S. Pat. No. 4,328,766 to Deibert teaches a casing which is intended to resemble a scaled-down brandy barrel that mounts an internal shaft on which is journaled a sleeve which mounts a leaf spring and a coiled leash which extends through a slot in the casing. The collar also mounts a drum with spaced holes in its circumference which coact with a detent finger externally operable by a button which is designed to simulate a bung plug in the barrel. The barrel loops have extended bails through which the dog's collar engages.

A THIRD EXAMPLE, U.S. Pat. No. 4,328,767 to Peterson teaches a retractor mechanism that is mounted on the collar adjacent the buckle, the weight of these parts holding them under the animal's neck when the leash is retracted. A guide ring half way around the collar provides a stop for a handle on the free end of the leash when the leash is retracted, thus positioning the handle on top of the animal's neck when the leash is not in use. A semicircular spring steel stiffening member extends between the retractor mechanism and said guide ring to secure these parts to the collar and provide a smooth sliding surface for the leash as it is extended and retracted.

A FOURTH EXAMPLE, U.S. Pat. No. 5,233,942 to Cooper et al. teaches a leash holder assembly that is removably mountable to the collar of a pet, and including a leash holder made of flexible material and having face-to-face rectangular panels that are stitched along their bottom and side edges in such a manner to provide an open-topped pouch for storing a leash in coiled-up condition, and including a rectangular closure flap that can fold over the top of the pouch to close the pouch. Velcro fastening elements used to secure the closure flap. Velcro equipped tabs secure the holder to the pet collar and the leash is attached at one of its ends to the collar and the handle of the stored leash protrudes through an opening in the pouch. The leash is quickly deployable when required by grasping the handle and pulling it away from the pouch so that the leash uncoils from the grasp of the pouch.

A FIFTH EXAMPLE, U.S. Pat. No. 5,947,062 to Hoffman et al. teaches a restraint system which can remain on an animal at all times. In one embodiment, the restraint system includes a strap which serves as both a collar and a leash. The restraint system can be in either an extended state or a retracted state. In the extended state, the collar portion is positioned around the animal's neck and the leash portion extends from the collar portion to the animal owner's hand. In the retracted state, the entire restraint system is stored around the animal's neck by reversibly attaching the leash portion to the collar portion, as well as to the leash portion itself, in an overlapping spiral configuration. VELCRO strips can be used to reversibly attach the leash and collar portions. Another embodiment of the invention includes a restraint system which includes a collar assembly coupled to a leash assembly. The collar assembly and the leash assembly are made from separate straps and are attached to each other by a connecting element. The connecting element can be, for example, a restraining ring, a rivet or thread (in which case the collar assembly is fixedly attached to the leash assembly), or a clasp (in which case the collar assembly is reversibly attached to the leash assembly). Both the collar assembly and the leash assembly include VELCRO strips which enable the leash assembly to be held to the collar assembly (and itself) when the leash assembly is wrapped around the collar assembly in an overlapping spiral configuration.

It is apparent that numerous innovations for retractable tethers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a retractable tether for a pet that avoids the disadvantages of the prior art.

ANOTHER OBJECT of the present invention is to provide a retractable tether for a pet that is simple to use.

BRIEFLY STATED, STILL ANOTHER OBJECT of the present invention is to provide a retractable tether for a pet. A leash is retractably connected to a collar by a pair of retractors. Each retractor includes a housing and a retracting mechanism. The retracting mechanism includes an axle and a recoilable spring. In one embodiment, the recoilable spring allows the leash to freely recoil and be automatically wrapped around the axle when tension is removed from the leash. In another embodiment, each retractor further includes a ratchet mechanism. The ratchet mechanism does not to allow the leash to freely recoil and be automatically wrapped around the axle when tension is removed from the leash, but rather requires an initial tug on the leash and maintaining tension thereon to cause the leash to wrap around the axle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
FIG. 1 is a diagrammatic perspective view of the present invention in use.

LIST OF REFERENCE NUMERALS UTILIZED IN THE DRAWING 10 retractable tether of present invention
12 pet
14 collar
16 leash
18 pair of retractors
20 first end of collar 14
21 second end of collar 14
22 ring of collar 14
24 hook and loop fasteners of collar 14
26 facing surfaces of other end of pair of ends 20 of collar 14
28 pair of ends of leash 16

First Embodiment 118 pair of retractors
130 housing of each retractor of pair of retractors 118
132 retracting mechanism of each retractor of pair of retractors 118
134 slit in housing 130 of each retractor of pair of retractors 118
136 axle of retracting mechanism 132 of each retractor of pair of retractors 118
138 recoilable spring of retracting mechanism 132 of each retractor of pair of retractors 118

Second Embodiment 218 pair of retractors
230 housing of each retractor of pair of retractors 218
232 retracting mechanism of each retractor of pair of retractors 218
236 axle of retracting mechanism 232 of each retractor of pair of retractors 218
240 ratchet mechanism of each retractor of pair of retractors 218

DETAILED DESCRIPTION OF THE PREFERRED EMBODIMENT

Referring now to the figures, in which like numerals indicate like parts, and particularly to FIG. 1, the retractable tether of the present invention is shown generally at 10 for a pet 12.

Figure 2:
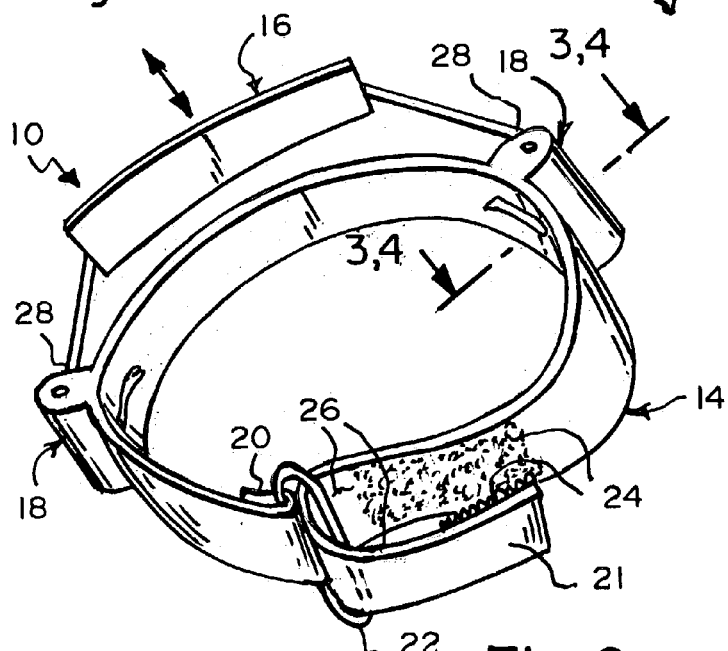
FIG. 2 is an enlarged diagrammatic perspective view of the area generally designated by the arrow 2 in FIG. 1 of the present invention.

The overall configuration of the retractable tether 10 can best be seen in FIG. 2, and as such, will be discussed with reference thereto.

The retractable tether 10 comprises a collar 14, a leash 16, and a pair of retractors 18. The leash 16 is retractably connected to the collar 14 by the pair of retractors 18.

The collar 14 is slender and elongated.

The collar 14 has a pair of ends 20, 21 and a ring 22. The ring 22 of the collar 14 is attached to the first end 20 of the collar 14 by the one end 20 of the collar 14 passing therethrough, doubling back onto itself, and being affixed to itself.

The second end 21 of the collar 14 passes freely through the ring 22 of the collar 14, doubles back onto itself, and is adjustably and replaceably affixed to itself by hook and loop fasteners 24. The hook and loop fasteners 24 of the collar 14 are disposed on facing surfaces 26 of the second end 21 of the collar 14.

The leash 16 is slender and elongated.

The leash 16 has a pair of ends 28. The pair of ends 28 of the leash 16 are operatively connected to the pair of retractors 18, respectively.

The pair of retractors 18 are diametrically opposed to each other and attached to the collar 14.

Figure 3:
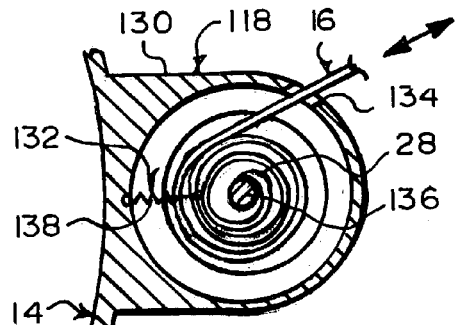
FIG. 3 is an enlarged diagrammatic cross sectional view taken on line 3—3 in FIG. 2 of a first embodiment of the retractor of the present invention.

The specific configuration of a first embodiment of each retractor 118 can best be seen in FIG. 3, and as such, will be discussed with reference thereto.

Each retractor 118 comprises a housing 130 and a retracting mechanism 132. The retracting mechanism 132 of each retractor 118 is operatively connected within the housing 130 thereof and to an associated end 28 of the leash 16.

The housing 130 of each retractor 118 is generally cylindrically-shaped. The housing 130 of each retractor 118 extends generally normally to the collar 14.

The housing 130 of each retractor 118 has a slit 134. The slit 134 in the housing 130 of each retractor 118 extends axially therealong. The leash 16 extends through the slit 134 in the housing 130 of each retractor 118.

The retracting mechanism 132 of each retractor 118 comprises an axle 136 and a recoilable spring 138. The recoilable spring 138 of the retracting mechanism 132 of each retractor 118 is shown diametrically in FIG. 3.

The axle 136 of the retracting mechanism 132 of each retractor 118 extends axially and rotatably within the housing 130 of the retracting mechanism 132 of an associated retractor 118. An end 28 of the leash 16 extends through the slit 134 in the housing 130 of the associated retractor 118 and is attached to the axle 136 of the retracting mechanism 132 of the associated retractor 118.

The recoilable spring 138 of the retracting mechanism 132 of each retractor 118 operatively connects the axle 136 of the retracting mechanism 132 of the associated retractor 118 to the housing 130 of the associated retractor 118.

The recoilable spring 138 of the retracting mechanism 132 of each retractor 118 allows the leash 16 to freely recoil and be automatically wrapped around the axle 136 of the retracting mechanism 132 of the associated retractor 118 when tension is removed from the leash.

Figure 4:
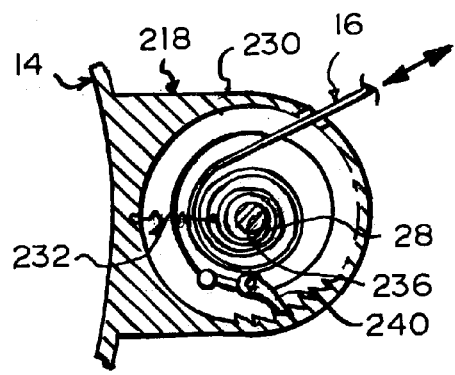
FIG. 4 is an enlarged diagrammatic cross sectional view taken on line 4—4 in FIG. 2 of a second embodiment of the retractor of the present invention.

The specific configuration of a second embodiment of each retractor 218 can best be seen in FIG. 4, and as such, will be discussed with reference thereto.

Each retractor 218 is identical to each retractor 118, but with the addition of a ratchet mechanism 240.

The ratchet mechanism 240 of each retractor 218 operatively connects the axle 236 of the retracting mechanism 232 of the associated retractor 218 to the housing 230 of the associated retractor 218.

The ratchet mechanism 240 of each retractor 218 does not allow the leash 16 to freely recoil and be automatically wrapped around the axle 236 of the retracting mechanism 232 of the associated retractor 218 when tension is removed from the leash, but rather requires an initial tug on the leash 16 and maintaining tension thereon to release the ratchet mechanism 240 of the associated retractor 218 (similar to that of a conventional window shade) to cause the leash 16 to wrap around the axle 236 of the retracting mechanism 232 of the associated retractor 218.

It will be understood that each of the elements described above, or two or more together, may also find a useful application in other types of constructions differing from the types described above.

While the invention has been illustrated and described as embodied in a retractable tether for a pet, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A retractable tether for a pet, comprising:
a) a collar;
b) a leash; and
c) a pair of retractors;
wherein said leash is retractably connected to said collar by said pair of retractors, wherein said collar has a pair of ends;
wherein said collar has a ring; and
wherein said ring of said collar is attached to a first end of said collar by said first end of said collar passing therethrough, doubling back onto itself, and being affixed to itself, wherein a second end of said collar passes freely through said ring of said collar, doubles back onto itself, and is adjustably and replaceably affixed to itself by hook and loop fasteners; and
wherein said hook and loop fasteners of said collar are disposed on facing surfaces of said second end of said collar.

2. The tether as defined in claim 1,
wherein said collar is slender; and
wherein said collar is elongated.

3. The tether as defined in claim 1,
wherein said leash is slender;
wherein said leash is elongated.

4. A retractable tether for a pet, comprising:
a) a collar;
b) a leash; and
c) a pair of retractors;
wherein said leash is retractable connected to said collar by said pair of retractors, wherein said pair of retractors are diametrically opposed to each other; and
wherein said pair of retractors are attached to said collar.

5. A retractable tether for a pet, comprising:
a) a collar;
b) a leash; and
c) a pair of retractors;
wherein said leash is retractable connected to said collar by said pair of retractors, wherein said leash has a pair of ends; and
wherein said pair of ends of said leash are operatively connected to said pair of retractors, respectively,
wherein each retractor comprises a housing;
wherein each retractor comprises a retracting mechanism;
wherein said retracting mechanism of each retractor is operatively connected within said housing of an associated retractor; and
wherein said retracting mechanism of each retractor is operatively connected to an associated end of said leash.

6. The tether as defined in claim 5, wherein said housing of each retractor is generally cylindrically-shaped; and
wherein said housing of each retractor extends generally normally to said collar.

7. The tether as defined in claim 5, wherein said housing of each retractor has a slit;
wherein said slit in said housing of each retractor extends axially therealong; and
wherein said leash extends through said slit in said housing of each retractor.

8. The tether as defined in claim 7, wherein
said retracting mechanism of each retractor comprises an axle; and
wherein said retracting mechanism of each retractor comprises a recoilable spring.

9. The tether as defined in claim 8, wherein said axle of said retracting mechanism of each retractor extends axially within said housing of said retracting mechanism of said associated retractor;
wherein said axle of said retracting mechanism of each retractor extends rotatably within said housing of said retracting mechanism of said associated retractor; and
wherein an end of said leash extends through said slit in said housing of said associated retractor and is attached to said axle of said retracting mechanism of said associated retractor.

10. The tether as defined in claim 8, wherein said recoilable spring of said retracting mechanism of each retractor operatively connects said axle of said retracting mechanism of said associated retractor to said housing of said associated retractor.

11. The tether as defined in claim 8, wherein said recoilable spring of said retracting mechanism of each retractor allows said leash to freely recoil and be automatically wrapped around said axle of said retracting mechanism of said associated retractor when tension is removed from said leash.

12. The tether as defined in claim 8, wherein each retractor comprises a ratchet mechanism.

13. The tether as defined in claim 12, wherein said ratchet mechanism of each retractor operatively connects said axle of said retracting mechanism of said associated retractor to said housing of said associated retractor.

14. The tether as defined in claim 12, wherein said ratchet mechanism of each retractor does not allow said leash to freely recoil and be automatically wrapped around said axle of said retracting mechanism of an associated retractor when tension is removed from said leash, but rather requires an initial tug on said leash and maintaining tension thereon to release said ratchet mechanism of said associated retractor to cause said leash to wrap around said axle of said retracting mechanism of said associated retractor.

* * * * *